(12) United States Patent
Cabrera-Llanos et al.

(10) Patent No.: US 6,722,294 B2
(45) Date of Patent: Apr. 20, 2004

(54) METHOD AND APPARATUS FOR FEEDING A PULVERIZED MATERIAL

(75) Inventors: Roberto Marcos Cabrera-Llanos, Nuevo León (MX); Iván Jorge Solis-Martinez, Nuevo León (MX); Rafael Valadez-Castillo, Nuevo León (MX)

(73) Assignee: Vitro Global, S.A., Givisiez (CH)

( * ) Notice: Subject to any disclaimer, the term of this patent is extended or adjusted under 35 U.S.C. 154(b) by 0 days.

(21) Appl. No.: 10/213,661

(22) Filed: Aug. 6, 2002

(65) Prior Publication Data

US 2004/0025762 A1 Feb. 12, 2004

(51) Int. Cl.[7] ............................... F23B 7/00; F23K 3/00
(52) U.S. Cl. ............... 110/341; 110/101 R; 110/101 C; 110/105; 110/101 CC; 110/101 CD; 110/293
(58) Field of Search ................. 406/32, 33; 110/101 C, 110/341, 101 R, 105, 185, 191, 267, 293, 101 CC, 101 CD; 65/134.4, 135.9, 136.3, 157, 335, 336, 337

(56) References Cited

U.S. PATENT DOCUMENTS

| | | | |
|---|---|---|---|
| 4,118,075 A | * 10/1978 | Lubbehusen | 302/53 |
| 4,486,100 A | * 12/1984 | Endo et al. | 366/76 |
| 4,528,848 A | 7/1985 | Hafner | 73/218 |
| 4,570,552 A | * 2/1986 | Rachner et al. | 110/347 |
| 4,582,454 A | * 4/1986 | Brandenburg et al. | 406/32 |
| 4,661,024 A | 4/1987 | Hafner | 406/63 |
| 4,758,118 A | * 7/1988 | Rachner et al. | 406/24 |
| 4,883,390 A | * 11/1989 | Reintjes et al. | 406/24 |
| 5,184,892 A | 2/1993 | Hafner | 366/10 |
| 5,353,647 A | 10/1994 | Toerner | 73/801.37 |
| 5,670,751 A | 9/1997 | Hafner | 177/1 |
| 5,988,951 A | * 11/1999 | DiFrank et al. | 406/32 |
| 6,041,664 A | 3/2000 | Hafner | 73/861.353 |

* cited by examiner

*Primary Examiner*—Kenneth Rinehart
(74) *Attorney, Agent, or Firm*—Abelman, Frayne & Schwab

(57) ABSTRACT

An apparatus and method are provided for feeding a pulverized material which includes a first storage container for receiving and for discharging a flow of the pulverized material. The apparatus includes a separation chamber attached to the first storage container, which is alternately filled up or emptied out with the pulverized material. A second storage container is connected with an outlet of the separation chamber, for alternately filling the second storage container in accordance with a predetermined storage amount of pulverized material.

17 Claims, 4 Drawing Sheets

METHOD AND APPARATUS FOR FEEDING A PULVERIZED MATERIAL

BACKGROUND OF THE INVENTION

1. Field of the Invention

The present invention is related to a method and apparatus for feeding a pulverized material for a glass melting furnace and, in particular to a method and apparatus for feeding a pulverized material for a glass melting furnace which can continuously operate with a back pressure during the unloading of the pulverized material.

2. Related Prior Art

Melting glass has been done in different kinds of furnaces and of the types of fuels, depending on the final characteristics of the product and also regarding the thermal efficiency of the melting and refining processes. Unit melter furnaces have been used to melt glass (by means of gas fuel), these furnaces have several burners along the sides of the furnace, the whole unit looks like a close box where there is a chimney that can be placed either in the beginning of the feeder or at the very end of the furnace, it means, in the downstream of the process. However there is an enormous heat loss in the glass leaving high-temperature operating furnaces. At 2500° F., for example, the heat in the flue gases is 62 percent of the heat input for a natural gas fired furnace.

In order to take advantage of the remaining heat of the flue gases, a more sophisticated and expensive design come out, named as the regenerative furnace. It is well known that, to operate a regenerative glass melting furnace, a plurality of gas burners are associated with a pair of sealed regenerators disposed side-by-side. Each regenerator has a lower chamber, a refractory structure above the lower chamber and an upper chamber above the structure. Each regenerator has a respective port connecting the respective upper chamber with a melting and refining chamber of the furnace. The burners are arranged to burn fuel, such as natural gas, liquid petroleum, fuel oil or other gaseous or liquid fuels which are suitable for use in the glass melting furnace and thereby supply heat for melting and refining the glass making materials in the chamber. The melting and refining chamber is fed with glass making materials at one end thereof at which is located a doghouse and has a molten distributor disposed at the other end thereof, which comprises a series of ports through which molten glass may be removed from the melting and refining chamber.

The burners may be mounted in a number of possible configurations, for example a through-port configuration, a side-port configuration or an under-port configuration. Fuel, e.g. natural gas, is fed from the burner into the incoming stream of pre-heated air coming from each regenerator during the firing cycle, and the resultant flame and products of combustion produced in that flame extend across the surface of the melting glass, and transfer heat to that glass in the melting and refining chamber.

In operation, the regenerators are cycled alternately between combustion air and exhaust heat cycles. Every 20 minutes, or 30 minutes, depending on the specific furnaces, the path of the flame is reversed. The objective of each regenerator is to store the exhausted heat, which allows a greater efficiency and a higher flame temperature that could otherwise be the case with cold air.

For operating the glass melting furnace, the fuel fed to the burners and the combustion air supplied is controlled by measuring at the port mouth and the top of the structure, the quantity of oxygen and combustible material present so as to ensure that within the melting chamber or at points along the melting chamber, the combustion air fed is controlled in excess to that is required for combustion of the fuel being supplied, to ensure a complete combustion of the fuel.

However, due to the continuing upward spiral of energy costs (primarily natural gas), this have forced that the major float glass, containers and tableware manufacturers to add "surcharges" to truckloads of flat glass, bottles and other glass articles. Natural gas prices have increased over 120% this year (in México), far above previous estimates.

Taking into account the above, the present invention is related to the use a pulverized material as a source of fuel for melting glass and more specifically to a method and apparatus for metering a pulverized material to a furnace for melting glass.

Apparatuses for the continuous gravimetric metering of pourable material are know in the art. Gravimetric metering systems are generally adopted in application when the exact measurement and control of the material in question are of fundamental importance (pharmaceutical industry, chemical industry, cement industry, glass industry, food industry, etc.) or where the flows involved are so small that the error which occurs if a volumetric metering system is used is not tolerable.

Examples of the gravimetric metering apparatuses for pourable material are illustrated in the U.S. Pat. Nos. 4,528,848, 4,661,024, 5,184,892, 5,353,647, 5,670,751 and 6,041,664.

For example the U.S. Pat. No. 4,528,848 of Hans Häfner is related to a device for continuous, gravimetric metering and pneumatic conveying of pourable material provides that a material stream is conveyed over a measuring path while charging a load measuring device and the product of moment load and conveying speed is formed. The conveyor is in the form of a rotor having an essentially vertical axis and conveyor pockets in the form of chambers or cells which are moved with the rotor in a circular orbit over the measuring path. A housing surrounds the rotor in a pressure tight manner and includes a charging aperture and an emptying aperture which are rotationally displaced from one another. A load measuring device is connected to the housing and a tachometer is provided for measuring the angular velocity of the rotor. A pneumatic conveying system is provided which has feed lines respectively communicating with an air feed aperture in the housing and the emptying aperture.

The U.S. Pat. No. 4,661,024 of Hans W. Häfner is related to a method for operating an apparatus for continuous gravimetric metering and feeding of pourable material conveyed by a conveyer through a metering path, the conveyer including a rotor provided with conveyer pockets, having an essentially vertical axis and being arranged within a housing in a tightly sealed manner, the housing being provided with a charging station and a discharging station the latter including ports for connecting a pneumatic feeding system, wherein a gas is supplied to spaces within the housing and the rotor outside the metering path.

The U.S. Pat. No. 5,184,892 of Hans W. Häfner is related to a system and a method for continuous gravimetric metering, pneumatic conveying and/or mixing of pourable materials using metering apparatuses of a type such as e.g. disclosed in U.S. Pat. No. 4,528,848.

The U.S. Pat. No. 5,353,647 of Ludger Toerner is related to an apparatus for measuring a bulk material mass flow by measuring Coriolis forces that are caused by the mass flow passing through a winged wheel. The mass flow is introduced centrally onto the winged wheel, which rotates with a constant r.p.m. and diverts the mass flow radially outwardly. The Coriolis forces and thus the corresponding reaction torques which are proportional to the mass through-flow are measured with the aid of a torque joint interposed between a housing of the winged wheel and a drive motor for the shaft that drives the wheel. Force sensor elements, preferably in the form of bending beams, are incorporated into the torque joint and are deflected by the reaction torque moment applied to the motor housing. These bending beams provide an output signal that is proportional to the mass through-flow through the apparatus.

Other apparatus related to a gravimetric metering of bulk material is claimed in the U.S. Pat. No. 5,670,751 of Hans Wilhelm Häfner which includes a weighting container which is supported on at least one weighing cell connected to a weighing electronics and is connected by flexible connections to a bulk material feed line and a discharge line, wherein a pressure sensor is provided on the weighing container for detecting the pressure in the weighing container and the pressure sensor is connected to the weighing electronics for registering a weighing signal only when a limit pressure value is attained.

And finally, the U.S. Pat. No. 6,041,664 also of Hans W. Häfner es related to a method and an apparatus for continuous, gravimetric metering and mass flow determination of flowable material, with a flowmeter, especially a Coriolis measuring wheel, for determining the instantaneous mass flow and a metering device downstream of the flowmeter.

However, one of the main problems of the apparatuses for metering a pourable material is that, during the moment that the pulverized material is being unloading, a back pressure in the discharge of the material is provoked. This effect makes that the pulverized material be feeding in an irregular form provoking problems in the discharge and conveying of the pulverized material.

Other problem of the apparatuses of the previous art is that the many of the apparatuses were development for handling large quantities of pulverized material (up of one ton), which are extremely expensive and complex.

As can be seen of the above there are various types of apparatuses for the metering of a pourable material, each one designed in accordance to different objectives and applications in the industry.

In view of the foregoing, the present invention is related to a method and an apparatus for feeding a pulverized material for a glass melting furnace and some other applications, which supply a constant flow of the pulverized material to a series of burners that are associated with said glass melting furnace, in a relation side by side. Said pulverized material is feeding in a continuous form to burn the pulverized fuel in a melting and refining zone of the glass furnace. The pulverized material is mixed with air for feeding an air-fuel mixture toward each one of the cited burners for the melting of glass.

According with the above the present invention is related to an apparatus for feeding a pulverized material comprises: a first storage container including an upper section and a lower section, said first storage container having charging and discharging ports, respectively, to receive and to discharge a constant flow of a pulverized material; a separation chamber attached below of the first storage container, said separation chamber including an upper inlet and lower outlet, said upper inlet and said lower outlet being alternately opened and closed, to fill up or to empty out the separation chamber with the pulverized material, wherein the material entering is settled out under the influence of gravity forces into said separation chamber; a second storage container including an upper section and a lower section, the upper section of said second storage container being connected with the lower outlet of said separation chamber, for alternately filling the second storage container in accordance to a predetermined storage level or weight; discharging means attached to the lower section of second container for continuously discharge the pulverized material; pneumatic conveying means arranged with said discharging means for conveying the material discharged from the discharging means; and weighing means associated with the second storage container for controlling the filled up and emptied out of said second storage means in accordance with said predetermined storage level.

OBJECTIVES OF THE INVENTION

It is an object of the present invention to provide a method and apparatus for feeding a pulverized material for a glass melting furnace which can continuously operate with a back pressure during the unloading of the pulverized material.

It is a further objective of the present invention to provide a method and apparatus for feeding a pulverized material for a glass melting furnace, which is of a simple design, which is handling quantities of pulverized material from between 100 Kg/hr to 1600 kg/hr.

It is another objective of the present invention to provide a method and apparatus for feeding a pulverized material for a glass melting furnace, that is capable of dosing the pulverized material in an continuous form, with a minimal negative air pressure.

These and other objectives and disadvantages of the present invention will be evident to the experts in the field from the following detailed description of the invention, which is illustrated in the attached drawings.

DETAILED DESCRIPTION OF THE INVENTION

The invention will now described in relation to a specific embodiment, taking as reference a glass melting furnace and a dosing system for a pulverized material, which were illustrated in the pending U.S. patent application Ser. No. 09/816,254, and that will be taked as reference to describe the function of the present invention.

Figure 1:
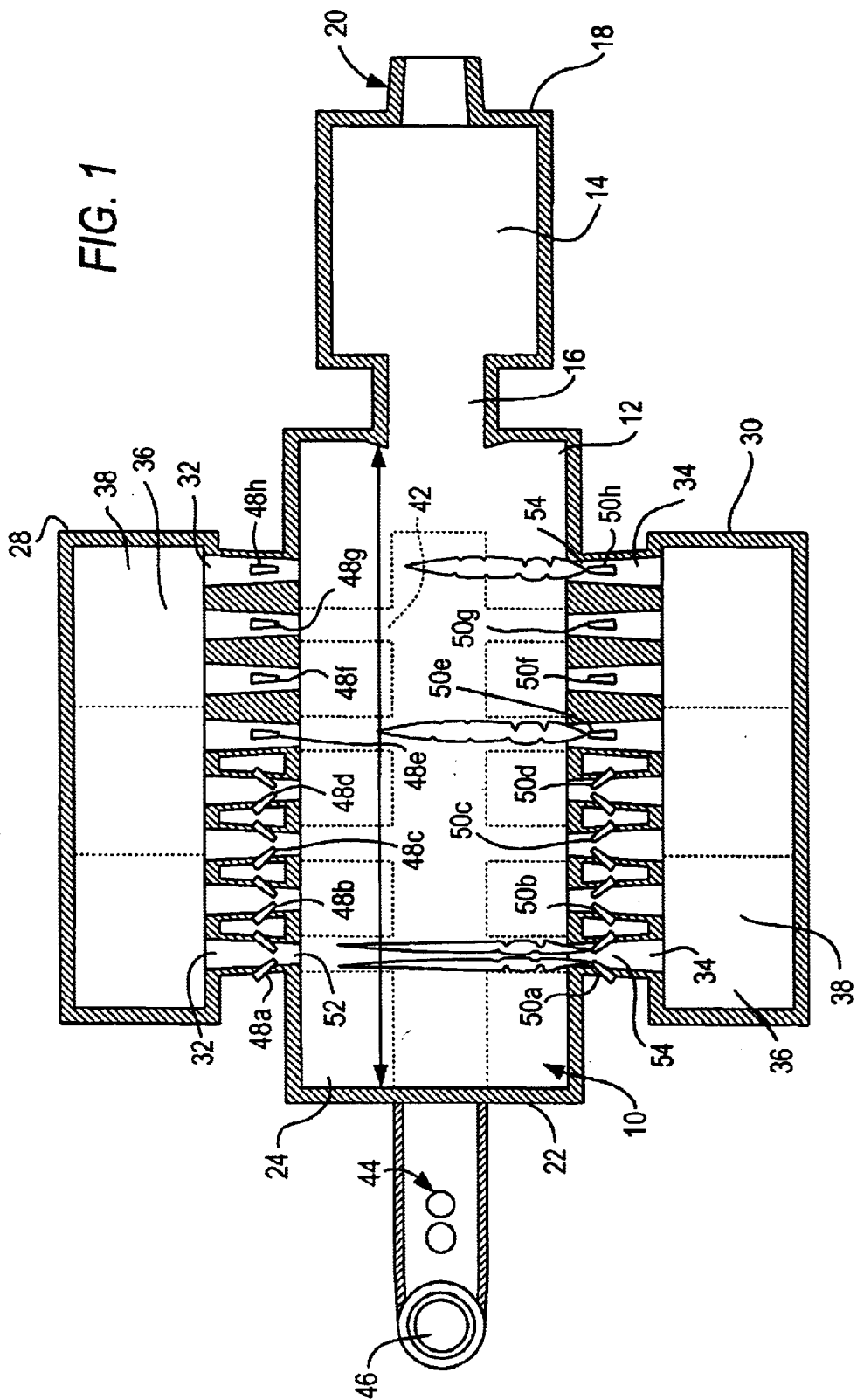
FIG. 1 is a schematic plant view of a glass melting furnace of the type side-port.

Making now reference to FIG. 1 here is showed a schematic view of a regenerative-type glass melting furnace, of type side port, which comprises a melting chamber 10, a refining chamber 12, a conditioning chamber 14 and a throat 16 between the refining chamber 12 and the conditioning chamber 14. At a front end 18 of the refining chamber 12 comprises a series of forehearth connections 20 through which molten glass is removed from the refining chamber 12. The rear end 22 of the melting chamber 10 including a dog house 24 through which glass making materials are fed by means of a batch charger (not shown). A pair of regenerators 28, 30 are provided by each side of the melting chamber 10. The regenerators 28 and 30 are provided with firing ports 32, 34, connecting each regenerator 28, 30, with the melting chamber 10. The regenerators 28, 30 are provided with a gas regenerator chamber 36 and an air regenerator chamber 38. Both chambers 36 and 38 are connected to a lower chamber 42, which is arranged to be communicated by means of dampers toward a tunnel 44 and a chimney 46 for the exhaust gases. Burners 48a, 48b, 48c, 48d 48e, 48f, 48g and 48h, as well as burners 50a, 50b, 50c, 50d, 50e, 50f, 50g and 50h are arranged by each port 32, 34, in a neck portion 52, 54, of each firing ports 32, 34 in order to burn fuel in the glass melting furnace.

So, when the glass making materials are fed through the dog house 24 in the rear end of the melting chamber 10, the melting glass is melted by the burners 48a–h, 50a–h, and floats in a forward direction until completely melting to pass from the melting chamber 10 to the conditioning chamber 14. During the operation of the furnace, the regenerators 28, 30 are cycled alternately between combustion air and exhaust cycles. Every 20 minutes, or 30 minutes, depending on the specific furnaces, the path of the flame of a series of burners 48a–h or 50a–h are reversed. So, the resultant flame and products of combustion produced in each burner 48a–h, 50a–h, pass across the surface of the melting glass, and transfer heat to that glass in the melting chamber 10 and refining chamber 12.

Figure 2:
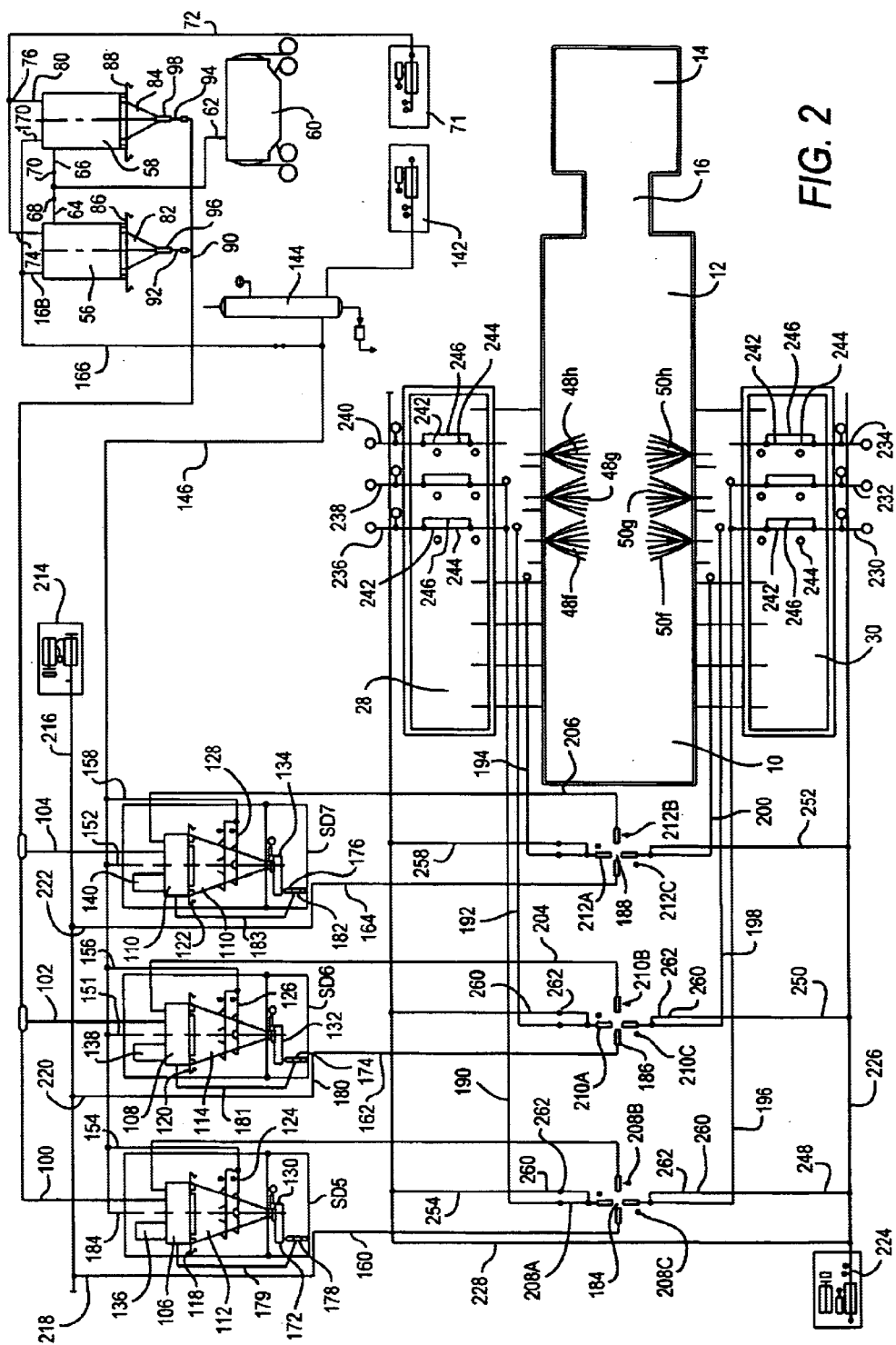
FIG. 2 is a schematic view of a system for feeding and burning a pulverized fuel to be used with the apparatus for feeding a pulverized material according with the present invention.

Making now reference to FIG. 2, a system for feeding and burning a pulverized fuel in a glass melting furnace comprises in a first embodiment of the present invention, first storage silos or tanks 56 and 58 for storing pulverized material for use in the glass melting furnace. The storage silos 56, 58 are fed through a wagon or wagon train 60 by means of a first inlet pipe 62 connected between the wagon train 60 and the silos 56, 58. The first main pipe 62 having first branch pipes 64, 66, which are connected respectively to each silo 56, 58, for the filing of each silo 56, 58. Valves 68, 70 are connected to each first branch pipe 64 and 66 to regulate the filing of each silo 56, 58. Each silo 56, 58 is filled by means of a vacuum effect through of a vacuum pump 71 by means of a first outlet pipe 72. The first outlet pipe 72 having second branch pipes 74, 76, to be connected with each silo 56, 58. Valves 78, 80 are connected by each second branch pipes 74, 76, to regulate the vacuum effect provided by the vacuum pump 70 for the filling of each silo 56, 58.

At the bottom of each silo 56, 58, a conical section 82, 84, and a gravimetric coke feeding system 86, 88, are included for fluidizing and for assuring a constant discharge flow of the pulverized coke into a second outlet pipe 90 where the pulverized material is forwarded to a solid fuel dosing system SD-5, SD-6 and SD-7. The second outlet pipe 90 including a third branch pipes 92, 94, connected to the bottom of each conical section 82, 84 of each silo or tank 56, 58. Valves 96, 98, are attached to each third branch pipe 92, 94, to regulate the flow of the pulverized petroleum coke to the second outlet pipe 90.

Making now reference to the dosing system in accordance with the present invention, the pulverized material is received in each solid fuel dosing system SD-5, SD-6 and SD-7 through the second outlet pipe 90. Fourth branch pipes 100, 102 and 104, are connected to the second outlet pipe 90, in order to transport the pulverized coke of the first silos or tanks 56 and 58 toward the solid fuel feeding system SD-5, SD-6 and SD-7. Each solid fuel feeding system SD-5, SD-6 and SD-7, including a second series of silos or tanks 106, 108, 110. The second series of silos 106, 108, 110, comprising a conical section 112, 114, 116; a gravimetric coke feeding system 118, 120, 122; an aeration system 124, 126, 128; a feeder 130, 132, 134; and a filter 136, 138 and 140, for discharging a constant flow of the pulverized coke toward each one of the burners 48f, 48g, 48h and burners 50f, 50g and 50h, as will be described later.

A pneumatic air compressor 142 and an air tank 144 are connected by means of a second main pipe 146. A first inlet branch pipes 148, 150, 152, are connected with the second main pipe 146 for supplying a filtered air—through of the filters 136, 138 and 140—to transport the coke toward the interior of each second series of silos or tanks 106, 108, 110. The second main pipe 146 also includes a first return branch pipes 154, 156, 158, that are connected with each aeration system 124, 126, 128, for permitting an adequate flow of the coke toward a third outlet pipes 160, 162, 164, as will described later. Additionally, a second inlet pipe 166 is connected with the second main pipe 146—after of the air tank 144—, which includes second inlet branch pipes 168, 170, that are connected on the upper part of each silo or tank 56, 58, for injecting air toward the interior of each silo or tank 56, 58.

The solid fuel feeding system SD-5, SD-6 and SD-7 including fourth outlet pipes 172, 174, 176, connected below of each feeder 130, 132, 134. A three-way regulatory valve 178, 180, 182, is connected respectively with the fourth outlet pipes 172, 174, 176, through a first way; a second way is connected with first return pipes 179, 181, 183, for returning the excess of pulverized coke toward each second series of silos or tanks 106, 108, 110, whereas the third way is connected with the third outlet pipes 160, 162, 164, which are used to supply an air-fuel mixture toward an arrangement of a four-way pipe 184, 186 and 188 related with the combustion system as be now described.

Making now reference to the combustion system, this is connected to each solid fuel feeding system SD-5, SD-6 and SD-7 through of a first way of the four-way pipe 184, 186 and 188, which are connected with each third outlet pipes 160, 162, 164 of each solid fuel feeding system SD-5, SD-6 and SD-7. A second way is connected respectively with fourth outlet pipes 190, 192, 194, for feeding the supply air-fuel mixture toward the burners 48h, 48g and 48f. A third way of the four-way pipe 184, 186 and 188, is connected to fifth outlet pipes 196, 198, 200 for feeding the air-fuel mixture toward the burners 50h, 50g and 50f; and a four outlet of the four-way pipe 184, 186, 188, is connected respectively to second return pipes 202, 204, 206, for returning the excess of pulverized coke toward each of the second series of silos or tanks 106, 108, 110. The four-way pipe 184, 186 and 188 having ball valves 208A to C, 210A to C, 212A to C, between a connection portion of the four-way pipe 184, 186 and 188 and the fourth outlet pipes 190, 192, 194; the fifth outlet pipes 196, 198, 200; and the second return pipes 202, 204, 206.

So in this way, during the operation of the furnace, the burners 48a-to-h or 50a-to-h are cycled alternately between combustion and non-combustion cycles. Every 20 minutes, or 30 minutes, depending the temperature set point on the specific furnaces, the path of the flame of a series of burners 48a-to-h or 50a-to-h are reversed. The air-fuel mixture that is arriving through the third outlet pipes 160, 162, 164, is regulated by the four-way pipe 184, 186 and 188 and ball valves 208A-to-C, 210A-to-C, 212A-to-C, for alternating the injection of the air-fuel mixture between the burners 48a-to-h and 50a-to-h. When the alternately operating cycle between the burners 48a-to-h and 50a-to-h is carried out, an amount of air-fuel is returned to the second series of silos or tanks 106, 108, 110 by means of the second return pipes 202, 204, 206.

The transport or secondary air that is supplied through the third outlet pipes 160, 162, 164, is used for transporting the material and for provoking high velocities of coke injection toward the nozzle of the each burner 48a-to-h and 50a-to-h. The transport or secondary air is supplied by means of a pneumatic supply air blower 214 through a third main pipe 216.

Fourth outlet pipes 218, 220 and 222 are connected with the third main pipe 216 and the third outlet pipes 160, 162, 164, for maintaining an elevated relation of the fuel-air mixture that is being supplied to the burners 48a-to-h and 50a-to-h.

For effectuating the combustion cycle of the burners 48a-to-h or 50a-to-h, each burner 48a-to-h or 50a-to-h are fed individually with the air-fuel mixture. This mixture will supplied through an internal tube of each burner 48a–h or 50a–h, and will arrive to a distribution chamber to be distributed to the diverse injection nozzles of each burner 48a–h or 50a–h.

For increasing the turbulence of the flows and the mixture of the pulverized fuel with a pre-heated combustion air in each burner 48a–h or 50a–h, a primary air is injected from a primary air blower 224, which is supplied under pressure through of the injection nozzles of each burner 48a–h or 50a–h. So, the operation of the burners 48a–h or 50a–h, will have a injection of coke through of pneumatic transportation with an elevated relation solid-air and with an relation of primary air of approximately 4% of a stoichiometric air.

A sixth outlet pipe 226 and a seventh outlet pipe 228 is connected with the primary air blower 224. The sixth outlet pipe 226 being connected with fifth branch pipes 230, 232, 234 and the seventh outlet pipe 228 being connected with sixth branch pipes 236, 238, 240. The exit end of each fifth and sixth branch pipes 230, 232, 234, 236, 238, 240, being connected in a direct way with each burner 48f-to-h or 50f-to-h. The flow of primary air in each fifth and sixth branch pipes 230, 232, 234, 236, 238, 240, are regulated individually by an arrangement of a first glove valve 242, a first ball valve 244 and a second glove valve 246.

Additionally, the sixth outlet pipe 226 includes seventh outlet pipes 248, 250 and 252, which are connected respectively with the fifth outlet pipes 196, 198, 200. And, the seventh outlet pipe 228 includes sixth outlet pipes 254, 256, 258, which are connected respectively with the fourth outlet pipes 190, 192, 194. Each sixth and seventh outlet pipes 248, 250, 252, 254, 256, 258, having a check valve 260 and a ball valve 262.

Through the arrangement above described, the primary air blower 224 will supply a primary air to the burners 48f-to-h (left burners) or burners 50f-to-h through the sixth outlet pipe 226 and the seventh outlet pipe 228 and by each fifth and sixth branch pipes 230, 232, 234, 236, 238, 240. The air blower 224 will operate to supply a maximum air flow during the operation of each burner 48f-to-h or burners 50f-to-h, meanwhile a minimum air flow will be provide for the burners 48f-to-h or burners 50f-to-h that are not operating by means of each sixth and seventh outlet pipes 248, 250, 252, 254, 256, 258, to guarantee the better conditions to be cooled.

DETAILED DESCRIPTION OF THE FEEDING APPARATUS OF THE PRESENT INVENTION

Figure 3:
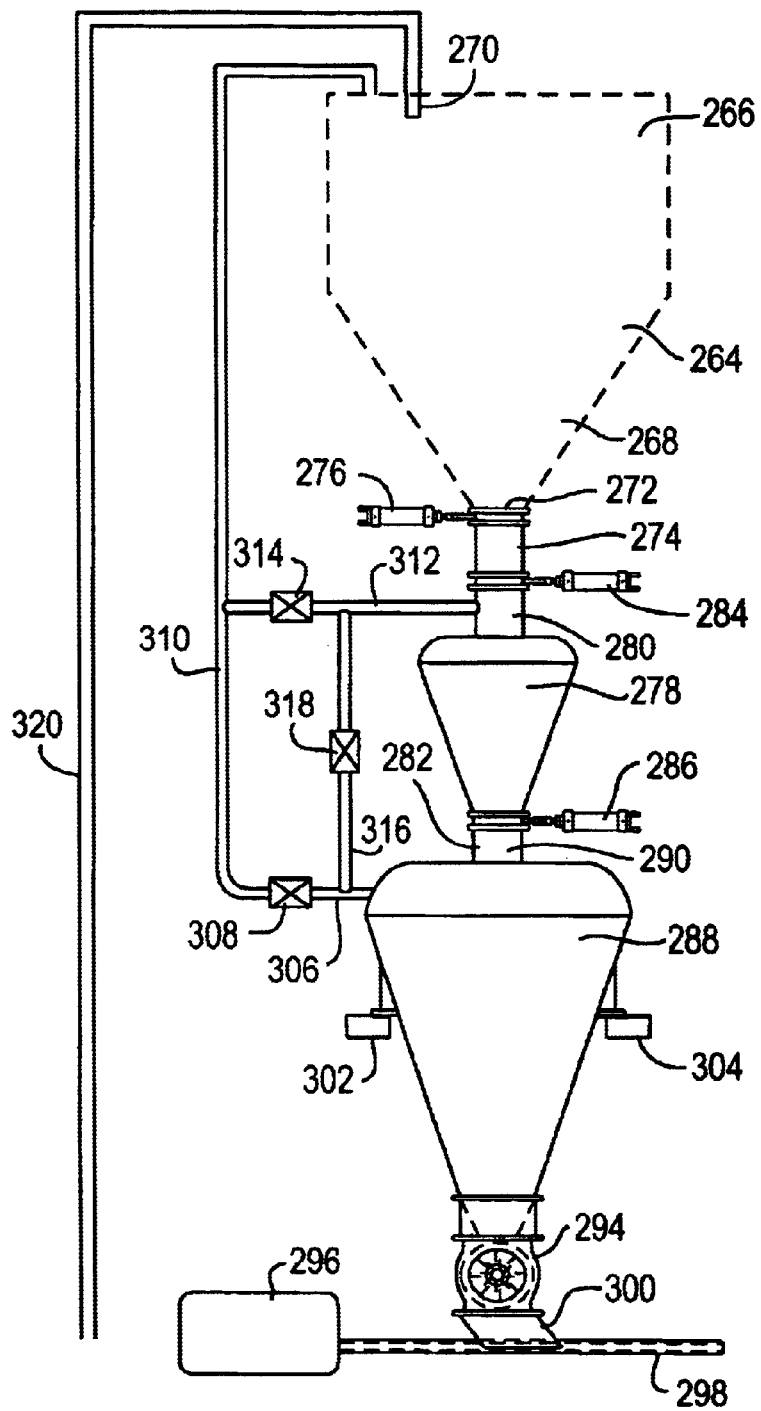
FIG. 3 is a longitudinal sectional view of the apparatus for feeding a pulverized material according with the present invention; and, FIG. 4 is a schematic diagram of the apparatus for feeding a pulverized material of the present invention.

Referring now to FIG. 3, this shows a specific embodiment of the feeding apparatus of the present invention, which comprises: a first storage silo 264 that includes an upper section 266 and a lower section 268. The upper section 266 including an inlet 270 through which pulverized fuel is fed to the first storage silo 264. The silo 264 also includes a discharge port or exit 272, a discharge tube 274 and a first damper 276 for discharging a constant flow of the pulverized material and for maintenance purposes. A separation chamber or sluice 278 attached below of the discharge tube 274 of said first storage silo 264, the separation chamber 278 including an upper inlet 280 and lower outlet 282. A second damper 284 connected above the upper inlet 280 of the separation chamber 278 and a third damper 286 connected below the lower outlet 282 of the separation chamber 278, the second damper 284 and third damper 286, being associated with upper inlet 280 and the lower outlet 282, to alternately open or close the second damper 284 and third damper 286, to fill up or to empty out the separation chamber 278 with the pulverized material. The separation chamber can be of conical form or of any other form, in order to the material entering is settled out under the influence of gravity forces into the separation chamber 278. A second storage bin 288 that includes an upper section 290 and a lower section 292. The upper section 290 of the second storage bin 288 being connected with the lower outlet 288 of the separation chamber 278, for continuously filling the second storage bin 292 in accordance to a predetermined storage level or weight. The pulverized material stored in the second storage bin 292 is discharged in a continuous form through an air lock rotary valve or star feeder or cellular wheel sluice 294 attached to the lower section 292 of second silo 288 for continuously discharge the pulverized material toward the third outlet pipes 160 or 162 or 164, of the system previously described. An air blower 296 associated with a main pipe 298 is located under the exit end 300 of an air-lock rotary valve or star feeder or cellular wheel sluice 294, in order to convey the pulverized material that is being provided from the second bin 288 through the main pipe 298. This main pipe 298 can be connected, as an example to each one of the third outlet pipes 160 or 162 or 164 illustrated in FIG. 2. The second storage bin 288 including load cells 302, 304, associated with the second storage bin 288 for controlling the filled and emptied of the second storage silo 288 in accordance with a predetermined storage level in the same. Two level sensors 336 and 338 are supplied for the same purpose. Additionally they are use for volumetric feeding of the machine or filling purposes of the storage silo 288 in case of load cells failure. Associated with the feeding apparatus of the present invention there are connected some series of pipes to balance the pressures exerted during the charge and discharge of the pulverized material. A first pipe 306 connected with the upper section 290 of the second storage bin 288, a first valve 308 associated with said first pipe 306, and second pipe 310 connected between said first valve 308 and the upper section 266 of the first storage silo 264. A third pipe 312 connected with the upper part 280 of the separation chamber 278, a second valve 314 connected with the free end of the third pipe 312 and a fourth pipe connecting the second valve 314 with the first pipe 310. This arrangement is carried out for connecting the upper part 280 of the separation chamber 278 with the first pipe 310, for compensation of internal pressure between the tanks so, the system can not create excess pressure. And, a fourth pipe 316 and a third valve 318 connected between the first pipe 306 and third pipe 312. Finally, an entrance pipe 320 is associated with the inlet 270 to charge the pulverized fuel in the first storage silo 264.

Figure 4:
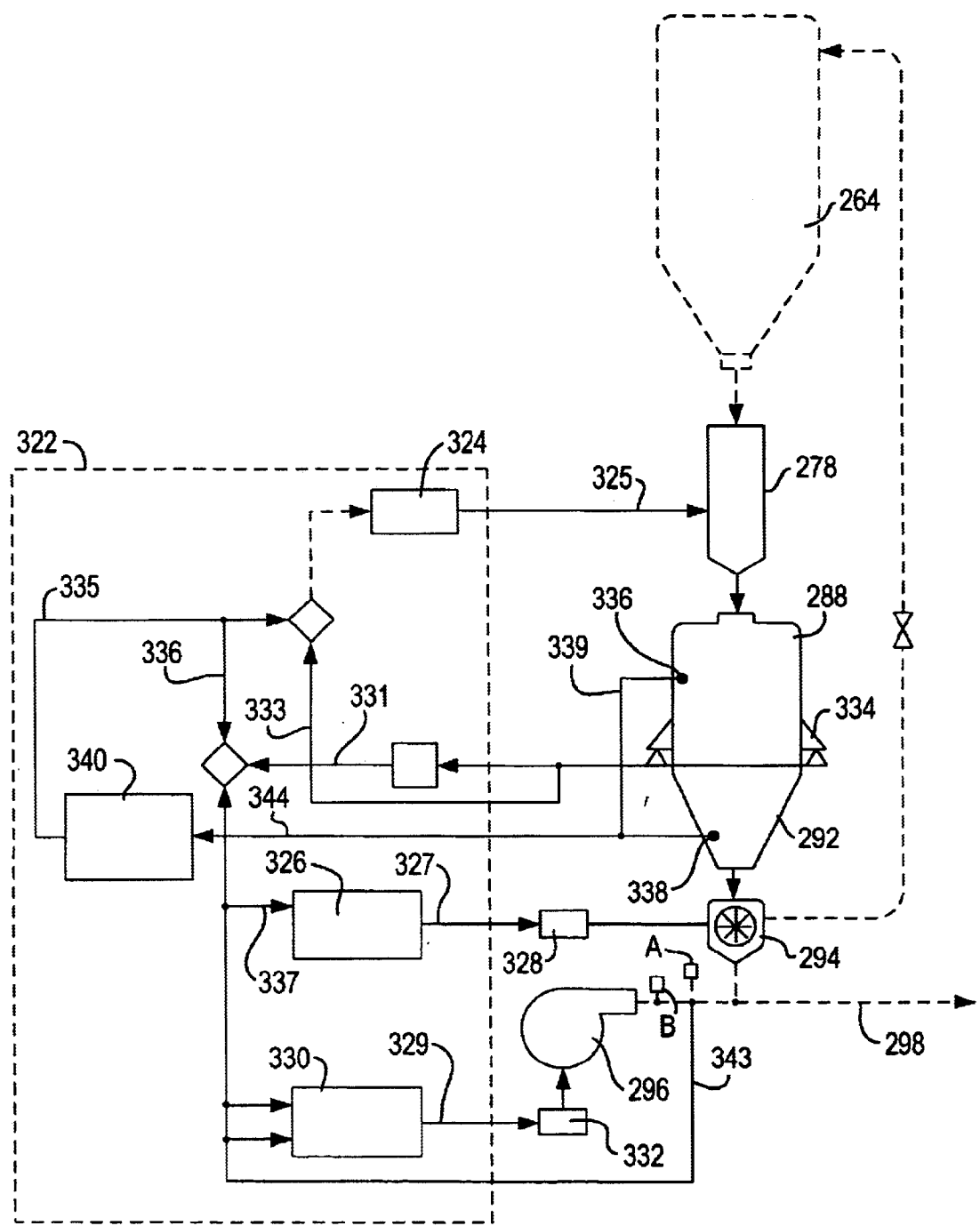

Finally, making now reference to the FIG. 4, the apparatus is associated to a feeder control system 322 for controlling alternately the fill up and empty out the separation chamber 278 and the second storage bin 288, for the dosing of the pulverized material toward each the burners 48a-to-h or 50a-to-h. The feeder control system 322 comprises a filled control 324 connected by means of the line 325 to the separation chamber 278, for sending a representative signal to indicate the filled up or emptied out of the separation chamber 278. The filled control 324 receive a signal from load cells 302, 304 or from level sensors 338, 336. The feeder control system 322 will decide which signal should handle the filling cycle of separation chamber 278 according to a special identification control algorithms. A fuel feedrate control 326 is connected by means of the line 327 to the air-lock rotary valve or star feeder or cellular wheel sluice 294, for controlling the velocity of said air-lock rotary valve or star feeder or cellular wheel sluice 294. The velocity control is regulated by means of a variable speed drive 328 in accordance to the fuel requirements in the glass melting furnace. A conveying air flowrate control 330 will regulate the air/fuel ratio required by the process, said conveying air flowrate control 330 is connected by means of the line 329 to a second variable speed drive 332, that will take care direct control over the conveying air blower 296, in order to control tha required conveying air that is being supplied with the pulverized material.

The feeder control system 322 comprises two embodiments to control the dosing of the pulverized material. In a first embodiment, this is controlled by means of a weight hopper 334, which is associated with the second storage bin 288 through the line 331. A second line 333 is associated with the line 331 and the fill control 324 for sending a representative signal to indicate the filled up or emptied out of the separation chamber 278. In this case the material dosing is carried out in a gravimetric dosing mode. The dosing control is calculated taking in consideration the slope generated by the weigh over the time of the pulverized material that is being detected in the second storage bin 288. So, each time that a minimum weight be detected in the second storage bin 288, the separation chamber 278 will be open or closed in an alternate way, for the continuous filling of the second storage bin 288. An alternative way to control the weight hopper 334 is by means of a feedrate estimator volumetric control 340 based on the level signals 336 and 338 from hopper 288 as well as, from the load cells 334 used as a primary reference for the filling up of the second storage bin 288. The feed rate estimator volumetric control 340 is connected with the fill control 324, fuel federate control 326 and conveying air flow rate control 330 through lines 335, 336 and 337.

In a second embodiment, the level control of the pulverized material is controlled by the use of level sensors. A first level sensor 336 is located in the upper part of the second storage bin 288 and a second level sensor 338 is located in the lower part of the second storage bin 288. In this case, the first level sensor 336 and the second level sensor 338 are connected by means of the lines 339 and 341 to the feedrate estimator volumetric control 340 for detecting the maximum and minimum level of pulverized material in the second storage bin 288. In this way, a signal is generated for opening or closing the separation chamber 278 in order to fill up the second storage bin 288. Also in this case, each time that a minimum level be detected in the second storage bin 288, the separation chamber 278 will be open or closed in an alternate way, for the continuous filling of the second storage bin 288. The feed estimator control 340 will calculate the elapsed time between the activation of such level sensors 336 and 338 in order to determine an appropiate signal that will be send to the fuel feedrate control 326 by means of line 335, 336 and 337 and extend to the conveying air flowrate control in case that volumetric feeding control is required by the application.

Finally, a mass flow air sensor "A" as well as a gage pressure sensor "B" are installed in the main pipe 298 and connected to the conveying air flowrate control 330 by means of line 343 in order to calculate the air flow rate in that said pipe 298 required by the air/fuel ratio according to the melter operation.

On the basis of the above, the operation of the apparatus for feeding the pulverized material in accordance with the present invention is as follow:

Filling the first a first storage silo 264 with the pulverized material, closing during the filling the first damper 276 located at the discharge port or exit 272 of said silo 264. Once the first storage silo 264 has been filled, the damper 276, the first damper 284 and the second damper 280 are opened, for discharging directly the pulverized material to the second storage bin 288, through the separation chamber 278. In this step the first valve 308 that is associated with the first pipe 306 and second pipe 310 is completely open, to liberate the air pressure that is being exerted during the filled of the second storage bin 288. The second valve 314 and third valve 318 are maintained closed. Once that the second storage silo 288 is completely filled with the pulverized material, the first damper 284 and the second damper 286 of the separation chamber 278 are closed. After this step, the pulverized material stored in the second storage silo 292 is discharged in a continuous form, through of the cellular wheel sluice 294 for continuously discharge the pulverized material. The discharge of the pulverized fuel is mixed with a flow of air through a main pipe 298 and the air blower 296.

After that the material pulverized has reached a level predetermined in the second storage bin 292, the first damper 284 is opened—the second damper 286 is maintained closed—and the separation chamber 278 is filled with the pulverized material. Once that the separation chamber 278 is completely filled with the pulverized material, the first damper 284 is closed and the second damper 286 is open (separation chamber 278 is emptied) in order to fill up and maintain the adequate level of the pulverized fuel in the second storage bin 292. In this step the first valve 308 and second valve 314 are closed and the third valve 318 is opened, to liberate the air pressure from the second storage bin 288 through the fourth pipe 316 and third pipe 312, which was exerted during the filling of the second storage silo 288. After the separation chamber 278 is emptied, the second damper 286 is closed, and the separation chamber 278 is again filled. The process of filling of the second storage bin 288 is in an alternative form, this is, once that a minimum level or weight of pulverized material has been detected in the second storage bin 288, the first damper 284 and the second damper 286 of the separation chamber 278 are alternately opened and closed, to fill or to empty the separation chamber 278 in accordance with the level or weight of pulverized material that is required by the second storage bin 288. The feedrate estimator volumetric control 340 can automatically switching, in the case of "fail", the calculus of the pulverized material in the second storage bin 292, whether by means of the level of said pulverized material or by means of the weight of the pulverized material in said second storage bin 292.

From the above, a apparatus for feeding a pulverized fuel has been described and will apparent for the experts in the art that many other features or improvements can be made, which can be considered within the scope determined by the following claims.

We claim:

1. A method for feeding a pulverized material, comprising:

feeding a separation chamber with said pulverized material from a first storage container;

feeding alternately a second storage container from said separation chamber, according to a predetermined storage amount of said pulverized material in said second storage container;

continuously discharging said pulverized material from said second storage container while controlling a vacuum effect in said second storage container during said discharging step; and, calculating the amount of said pulverized material in said second storage container, by determining the amount filled-up or emptied-out from the second storage container when the amount of pulverized material is not at a level or weight previously determined, wherein said calculating step includes:

calculating the weight variation over a period of time of the pulverized material that is detected in said second storage container for alternately opening or closing the separation chamber for the continuous filling of the second storage container based on the weight of material detected in said second storage container; and, alternately opening or closing said separation chamber, according to the weight of pulverized material in said second storage container.

2. The method for feeding a pulverized material as claimed in claim 1, wherein the step of calculating the predetermined amount of said pulverized material in said second storage means is carried out by weighing means.

3. The method for feeding a pulverized material as claimed in claim 1, further including the step of:

regulating a pressure exerted by the pulverized material in said first storage container, said second storage container and said separation chamber, during the charging and discharging of the pulverized material between each other.

4. The method for feeding a pulverized material as claimed in claim 1, further including the step of:

regulating a pressure exerted by the pulverized material in said second storage container and said first storage container, during the charging and discharging of the pulverized material between each other.

5. The method for feeding a pulverized material as claimed in claim 1, wherein the step of calculating a predetermined amount of said pulverized material includes the further step of:

automatically switching the calculation of the pulverized material in said second storage means to be carried out, by means of either the level of said pulverized material or by means of the weight of the pulverized material in said second storage container.

6. An apparatus for feeding a pulverized material which comprises a first storage container including an upper section and a lower section, said first storage container having charging and discharging ports, respectively, to receive and to discharge a constant flow of a pulverized material, said apparatus comprising:

a separation chamber attached to the first storage container, said separation chamber including an inlet and an outlet, said inlet and said outlet being alternately opened and closed, to fill up or to empty out the separation chamber with said pulverized material, said inlet and said outlet being alternately opened and closed for reducing a back pressure during the unloading of the pulverized material, resulting in a higher stability in the feeding during firing reversal;

a second storage container including an inlet and an outlet, the inlet of said second storage container being connected with the outlet of said separation chamber, for alternately filling the second storage container in accordance to a predetermined storage amount of said pulverized material, said inlet of said second storage container being regulated by alternately opening and closing the inlet and outlet of said separation chamber to avoid a vacuum effect during the discharge of the pulverized material of said second storage container;

discharging means attached to the outlet of said second storage container for continuously controlling the discharge of said pulverized material;

conveying means arranged with said discharging means for conveying the material discharged from the discharging means;

means for calculating the predetermined amount of the pulverized material in said second storage container, by alternately controlling the filling up and emptied out of said second storage container in accordance with a storage level or weight of the pulverized material in said second storage container; and, control means for processing signals provided by the means for calculating the amount of pulverized material in said a second storage container for alternately opening or closing said inlet and outlet of said separation chamber for the filling of the second storage container in accordance with the storage level or weight of pulverized material in said second storage container.

7. The apparatus for feeding a pulverized material as claimed in claim 6, wherein the separation chamber is an sluice.

8. The apparatus for feeding a pulverized material as claimed in claim 6, wherein a damper is provided on each inlet and outlet of said separation chamber.

9. The apparatus for feeding a pulverized material as claimed in claim 6, wherein the discharging means is a cellular wheel sluice.

10. The apparatus for feeding a pulverized material as claimed in claim 6, wherein the discharging means is an air-lock rotary valve.

11. The apparatus for feeding a pulverized material as claimed in claim 6, wherein the discharging means is a star feeder.

12. The apparatus for feeding a pulverized material as claimed in claim 6, wherein the means for calculating the amount of pulverized material are weighing means.

13. The apparatus for feeding a pulverized material as claimed in claim 12, wherein the weighing means is a weight hopper.

14. The apparatus for feeding a pulverized material as claimed in claim 6, wherein the means for calculating the amount of pulverized material are level sensors.

15. The apparatus for feeding a pulverized material as claimed in claim 6, wherein the conveying means are pneumatic means.

16. The apparatus for feeding a pulverized material as claimed in claim 6, wherein the first storage container, the separation chamber and the second storage container are provided with means for balancing the air pressure exerted during the charge and discharge of the pulverized material.

17. The apparatus for feeding a pulverized material as claimed in claim 6, wherein the control means comprises:

filling control means connected to said separation chamber for sending representative signals to indicate the filled up or emptied out of the separation chamber;

fuel control means connected to said discharging means, for controlling the velocity of said discharging means in accordance with the requirements of said pulverized material;

fluid flow control means connected to said conveying means for controlling the transportation and flow of a fluid that is supplied with said pulverized material; and, control means for processing signals provided by said filling control means, by said fuel control means and by said fluid flow control means for receiving and for generating signals of the level or weight of the pulverized material in said second storage container, for the filling of the second storage container.

* * * * *